June 2, 1964   R. BINDER   3,135,022
BALE RASP

Filed July 6, 1961

INVENTOR.
ROLF BINDER.
BY K. A. Mayr
ATTORNEY

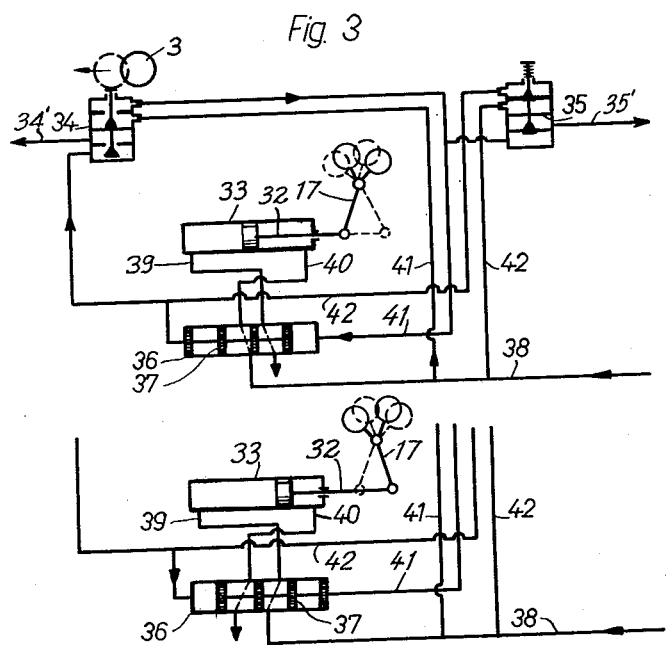

United States Patent Office 3,135,022
Patented June 2, 1964

3,135,022
BALE RASP
Rolf Binder, Winterthur, Switzerland, assignor to Rieter Machine Works Ltd., Winterthur, Switzerland, a corporation of Switzerland
Filed July 6, 1961, Ser. No. 122,176
Claims priority, application Switzerland July 8, 1960
3 Claims. (Cl. 19—80)

The present invention relates to a bale rasp as used in spinning mills for reducing hard pressed fibre bales.

Bale rasps are known which include a rotating rasp element having a plurality of spaced saw-tooth discs or beaters rotating around a common axis and projecting somewhat from a grate which supports the bale to be reduced. The beaters are most effective if they engage the bale in the direction of movement of the bale. If the bale reciprocates on the grate, movement of the bale in one direction produces satisfactory reduction whereas movement in the opposite direction considerably reduces the effect of the beaters and, consequently, the overall operating efficiency of the machine.

It is an object of the present invention to provide a bale rasp which avoids the aforesaid shortcomings of the conventional bale rasps. The rasp according to the invention comprises two rasp elements rotating in opposite directions around axes which are parallel, and individually including a plurality of axially spaced reducing elements which extend between and slightly project beyond parallel grate bars. The bale to be reduced is reciprocatingly moved on the grate bars parallel thereto. The rasp elements alternately engage the reciprocatingly moving bale so that the direction of the circumferential movement of the individual rasp element which engages the bale coincides with the direction of movement of the bale. To effect this operation the rasp elements are borne by a rocker which is rocked in synchronism with the reciprocating movement of the bale. The reducing elements may be formed by saw-tooth discs, the teeth of the discs forming part of one rasp element pointing in the opposite direction of the teeth of the discs of the second rasp element. Due to the rocking of the rocker only one rasp element engages the bale at a time when the bale moves in the direction in which point the teeth of the rasp element engaging the bale.

The novel features which are considered characteristic of the invention are set forth with particularity in the appended claims. The invention itself, however, and additional objects and advantages thereof will best be understood from the following description of an embodiment thereof when read in connection with the accompanying drawing wherein:

FIGS. 3 and 4 are diagrams illustrating control means forming part of the bale rasp according to the invention in different operating positions.

Figure 1:
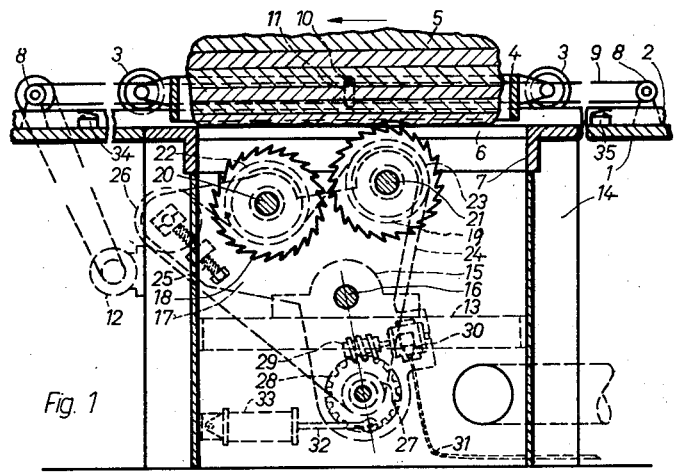
FIG. 1 is a diagrammatic vertical sectional view of a bale rasp according to the invention.

Referring more particularly to FIG. 1 of the drawing, numeral 1 designates the top of a table on which rails 2 are mounted for guiding wheels 3 of a bottomless carriage 4 for reciprocatingly moving a fibre bale 5 on a grate including a plurality of grate bars 6 which are placed in an opening 7 in the table top 1. The carriage 4 is moved by means of an endless wire rope 9 rolling around rollers 8 supported at the ends of the table top 1, a dog 10 being connected to the rope 9 and adapted to be received in a vertical slot 11 provided on the carriage 4. One of the rollers 8 is driven by a motor 12. The table top 1 is supported by a frame 14 provided with horizontal struts 13 supporting bearings 15 for a shaft 16. A rocker 17 is mounted on the shaft 16. The upper part of the rocker rotatably supports parallel shafts 20 and 21 each of which is provided with a plurality of spaced saw-tooth discs 18 and 19, respectively. The teeth of the discs 18 and 19 point in opposite directions. A pulley 22 is connected to the shaft 20 and a pulley 23 is connected to the shaft 21 for driving the shafts by means of an endless belt 24 which is so arranged that the shafts 20 and 21 rotate in opposite directions. The tension of the belt 24 is controlled by means of a tension roller 26 whose position can be adjusted by manipulating an adjusting screw 25. The belt 24 extends around a driving pulley 27 mounted to the lower part of the rocker 17. The pulley 27 is rotated by means of a worm gear 28, 29 which receives its drive from an electric motor 30 mounted on the rocker 17 and connected to a power line by a flexible cable 31. Rocking of the rocker 17 around the axis of the shaft 16 is effected by a rod 32 which is pivotally connected to the rocker and is connected to a piston in a control cylinder 33 swingably connected to the frame 14. Supply of an operating fluid to and release of an operating fluid from the cylinder 33 is controlled by a piston valve 37 (FIGS. 3 and 4) in a casing 36, the piston valve being actuated according to the position of control valve devices 34 and 35, each device including two valves, in the manner described below.

As shown in FIGS. 3 and 4, a pressure fluid is supplied through a pipe 38 to the casing 36 of the piston valve 37 which controls the flow of pressure fluid either through a pipe 39 to the left end of the control cylinder 33, or through a pipe 40 to the right end of the control cylinder 33. The ends of the casing 36 of the piston valve 37 are individually connected to the supply pipe 38 by means of pipes 41 and 42 wherein the upper valves of the devices 34 and 35, respectively, are interposed. Flow of pressure fluid through the pipe 41 to the right end of the casing 36 is controlled by the upper valve of the double valve device 34. Flow of pressure fluid through the pipe 42 to the left end of the casing 36 is controlled by the upper valve of the double valve device 35.

Figure 2:
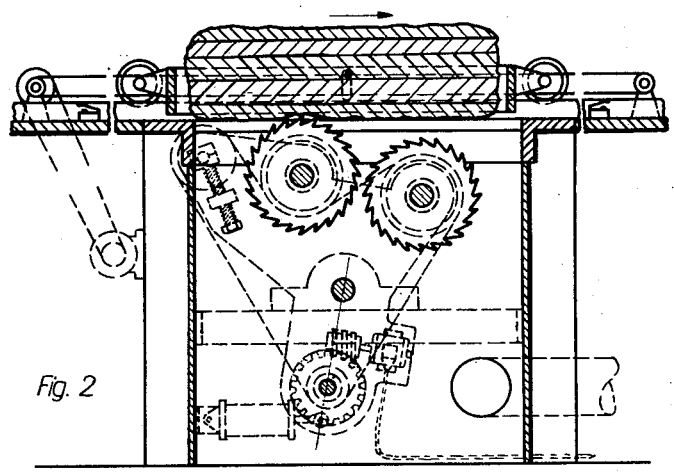
FIG. 2 is a diagrammatic vertical sectional view of the bale rasp shown in FIG. 1 in a different operating position.

The apparatus operates as follows: When a left wheel 3 of the carriage 4 runs on the valve device 34 and opens its valves against the action of a spring, not shown, pressure fluid is admitted to the right end of the casing 36, forcing the piston valve 37 into the position shown in FIG. 3 for admitting pressure fluid to the right end of the cylinder 33. This causes movement of the piston in the cylinder 33 from right to left and rocking of the rocker 17 in clockwise direction into the position shown in FIG. 2 and in solid lines in FIG. 3. The bale can now be moved from left to right and worked by the rasp 18. When the left wheel 3 of the carriage leaves the valve device 34, its valves are closed by spring action and the mechanism remains in the position shown in FIG. 2 until wheel 3 on the right end of the carriage 4 opens the valves of the device 35. This causes admission of pressure fluid to the left side of the piston valve 37 moving the valve into the position shown in FIG. 4. This causes flow of pressure fluid into the left end portion of cylinder 33 and movement of the piston in the cylinder 33 from left to right and swinging of the rocker 17 in counterclockwise direction into the position shown in FIG. 1 and in solid lines in FIG. 4 so that the machine is now in a position for working the bale by the rasp 19 and moving the bale from right to left.

The lower valve in the device 34 is for releasing the pressure fluid from the left side of the valve 37 when the latter moves from right to left into the position shown in FIG. 3. The lower valve of the device 35 is for releasing pressure fluid from the right side of the valve 37 when the latter moves from left to right into the position shown in FIG. 4. The pressure fluid is released from the lower valves of the devices 34 and 35 through outlet pipes 34' and 35', respectively.

I claim:

1. A rasp for reducing fibre bales in spinning mills comprising:
 a grate,
 means for reciprocating a fibre bale on said grate,
 two rotatable rasp elements rotating in opposite directions and adapted to individually extend through said grate for working on a bale moving on the grate,
 a device for rotatably supporting and extending one of said rasp elements through said grate and withdrawing the second rasp element from the grate when the first rasp element is extended through the grate, and
 actuating means responsive to the position of said reciprocating means and operatively connected to said device for actuating the latter for extending one of said rasp elements through said grate upon movement of a bale in one direction on the grate and for extending the second rasp element through said grate upon movement of the bale in the opposite direction.

2. A rasp as defined in claim 1 wherein said device comprises a rocking element rotatably supporting said rasp elements and extending one of said rasp elements through said grate when said rocking element is in one extreme position and extending the second rasp element through said grate when said rocking element is in the opposite extreme position.

3. A rasp as defined in claim 1 wherein said rasp elements include saw-tooth discs, the teeth of said discs being inclined with respect to the radii on which they are placed, the teeth of the discs of one rasp element being inclined in a direction opposite to the inclination of the teeth of the second rasp element, and the rasp elements rotating in the direction of the inclination of the respective teeth.

References Cited in the file of this patent

UNITED STATES PATENTS

| 2,445,912 | Frost | July 27, 1948 |
| 2,938,239 | Leineweber et al. | May 31, 1960 |

FOREIGN PATENTS

| 1,191,797 | France | Apr. 3, 1959 |